United States Patent
Nguyen

(12) 
(10) Patent No.: US 6,542,923 B2
(45) Date of Patent: *Apr. 1, 2003

(54) ACTIVE ELECTRONIC MAIL

(75) Inventor: Julien T. Nguyen, Saratoga, CA (US)

(73) Assignee: Planet Web, Inc., Redwood Shores, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/918,698

(22) Filed: Aug. 21, 1997

(65) Prior Publication Data

US 2002/0059447 A1 May 16, 2002

(51) Int. Cl.$^7$ ............................................. G06F 15/16
(52) U.S. Cl. ..................................................... 709/206
(58) Field of Search ................................ 395/610, 682, 395/701, 702, 200.32, 200.33, 200.48; 707/513, 10; 709/202, 203, 218, 302, 206

(56) References Cited

U.S. PATENT DOCUMENTS

| | | |
|---|---|---|
| 5,204,947 A | 4/1993 | Bernstein |
| 5,377,354 A | 12/1994 | Scannell et al. |
| 5,499,109 A | 3/1996 | Mathur et al. |
| 5,508,817 A | 4/1996 | Kunigami |
| 5,513,126 A | 4/1996 | Hackins et al. |
| 5,548,789 A | 8/1996 | Nakanura |
| 5,574,843 A | 11/1996 | Gerlach, Jr. |
| 5,619,648 A | 4/1997 | Canale et al. |
| 5,623,603 A | 4/1997 | Jiang et al. |
| 5,627,764 A | 5/1997 | Schutzman et al. |

(List continued on next page.)

FOREIGN PATENT DOCUMENTS

WO    WO 99/50744 A1    10/1999

OTHER PUBLICATIONS

McNamara, Start–up Novita makes multimedia E–mail a snap, Dec. 9, 1996, Network World, vol. 13, Issue 50, p. 31.*
Bert, How do I send e–mail from a Java applet?, Aug. 1996, Dr. Dobbs Journal, vol. 21, Issue 8, Abstract.*

(List continued on next page.)

*Primary Examiner*—Moustafa M. Meky
*Assistant Examiner*—Bradley Edelman
(74) *Attorney, Agent, or Firm*—Swernofsky Law Group PC

(57) ABSTRACT

The invention provides a method and system for formatting electronic mail for transmission, in which electronic mail messages include the operational results of one or more applets. An electronic mail client creates an electronic mail message using one or more applets, each of which may operate to actively receive, transform, and display information to be presented with the electronic mail message. At or near a time when the electronic mail message is formatted for transmission, editable program code for the applets is removed, and any dynamic links between the applets are broken. The electronic mail message made available to the receiver can thus include active elements, but any applets which are received are not editable by the receiver.

33 Claims, 1 Drawing Sheet

U.S. PATENT DOCUMENTS

| | | | |
|---|---|---|---|
| 5,630,060 A | 5/1997 | Tang et al. | |
| 5,666,542 A | 9/1997 | Katai et al. | |
| 5,675,507 A | 10/1997 | Bobo, II | |
| 5,680,619 A | 10/1997 | Gudmundson | |
| 5,694,163 A | 12/1997 | Harrison | |
| 5,706,502 A * | 1/1998 | Foley et al. | 395/610 |
| 5,710,883 A | 1/1998 | Hong | |
| 5,734,835 A | 3/1998 | Selker | |
| 5,737,599 A | 4/1998 | Rowe et al. | |
| 5,737,619 A | 4/1998 | Judson | |
| 5,742,768 A | 4/1998 | Gennaro et al. | |
| 5,754,700 A | 5/1998 | Kuzma | |
| 5,754,765 A | 5/1998 | Danneels | |
| 5,754,851 A | 5/1998 | Wissner | |
| 5,761,673 A | 6/1998 | Bookman et al. | |
| 5,764,235 A | 6/1998 | Hunt et al. | |
| 5,768,505 A | 6/1998 | Gilchrist et al. | |
| 5,781,741 A | 7/1998 | Imamura et al. | |
| 5,781,785 A | 7/1998 | Rowe et al. | |
| 5,784,553 A | 7/1998 | Kowala et al. | |
| 5,787,470 A | 7/1998 | DeSimone et al. | |
| 5,794,039 A | 8/1998 | Guck | |
| 5,794,259 A | 8/1998 | Kikinis | |
| 5,802,530 A | 9/1998 | Van Hoff | |
| 5,805,829 A | 9/1998 | Cohen et al. | |
| 5,809,512 A | 9/1998 | Kato | |
| 5,818,435 A | 10/1998 | Kozuka | |
| 5,818,447 A * | 10/1998 | Wolf et al. | 345/335 |
| 5,821,926 A | 10/1998 | Arita | |
| 5,826,102 A | 10/1998 | Escobar | |
| 5,828,839 A | 10/1998 | Moncreiff | |
| 5,835,683 A | 11/1998 | Corella et al. | |
| 5,842,020 A * | 11/1998 | Faustini | 395/701 |
| 5,845,299 A * | 12/1998 | Arora et al. | 707/513 |
| 5,848,415 A | 12/1998 | Guck | |
| 5,850,446 A | 12/1998 | Berger et al. | |
| 5,854,893 A | 12/1998 | Ludwig et al. | |
| 5,870,544 A | 2/1999 | Curtis | |
| 5,872,915 A | 2/1999 | Dykes et al. | |
| 5,875,322 A | 2/1999 | House et al. | |
| 5,878,223 A | 3/1999 | Becker et al. | |
| 5,889,942 A | 3/1999 | Orenshteyn | |
| 5,911,776 A | 6/1999 | Guck | |
| 5,918,012 A | 6/1999 | Astiz et al. | |
| 5,940,834 A * | 8/1999 | Pinard et al. | 707/102 |
| 5,956,491 A | 9/1999 | Marks | |
| 5,956,701 A | 9/1999 | Habermehl | |
| 5,963,217 A | 10/1999 | Grayson et al. | |
| 5,995,093 A | 11/1999 | Lambourne | |
| 6,014,688 A * | 1/2000 | Venkatraman et al. | 709/206 |
| 6,029,164 A * | 2/2000 | Birrell et al. | 707/3 |
| 6,032,150 A | 2/2000 | Nguyen | |
| 6,329,994 B1 * | 11/2001 | Gever et al. | 345/473 |

OTHER PUBLICATIONS

Doan, Java perks up client mail, Oct. 14, 1996, InfoWorld, vol. 18, Issue 42, p. 1.*

WebAuthor for Word. "My First Web Document".

Marc H. Brown et al. "A New Paradigm for Browsing the Web". Short Papers. Mar. 7–11, 1995. CHI'95 Mosaic Of Creativity.

Malcolm Graham et al. "Webbed Documents". DOC 95–10/95 Savannah, Georgia, USA.

Blumfield, Julie R. et al. "Step–By–Step To A World–Class Web Site". Windows Magazine. Jul. 1995. vol. 06. No. 08.

Tessier, Tom. "Using JavaScript to Create Interactive Web Pages". Dr. Dobb's Journal on CD–ROM.

Chung–Ming Huang et al: "Multimedia E–Mail: The Evolution Approach Based on Adapters" Software Practice & Experience, vol. 24, No. 9, Sep. 1, 1994, pp. 785–800, XP000655471 ISSN: 0038–0644 pp. 794, line 3–p. 797, line 2; figures 11,12.

Ouhyoung M et al: "The MOS Multimedia E–Mail System" Proceedings of the International Conference on Multimedia Computing and Systems, May 19, 1994, pp. 315–324, XP002073636 p. 315, right–hand column, line 21–p. 319, left–hand column, line 3; figures 1,2; table 1.

Anonymous: Graphical Command Line. IBM Technical Disclosure Bulletin, vol. 32, No. 8B, pp. 313–314, XP002109975 New York, US the whole document.

Anonymous: "Editing Word Processor Documents" IBM Technical Disclosure Bulletin, vol. 40, No. 7, pp. 187–188, XP002109976 New York, US.

Brown, Mark; Using Netscape 2, pp. 327–375.

* cited by examiner

ACTIVE ELECTRONIC MAIL

BACKGROUND OF THE INVENTION

1. Field of the Invention

The invention relates to electronic mail.

2. Related Art

"Electronic mail" is a technique in which messages are delivered between computers (or within a single computer), destined to be read by individual users. In addition to sending messages which are just text, it has recently become known to send messages which include additional information, such as text font information and graphical elements. It would be advantageous to include active elements in electronic mail, such as programs which are able to run on the receiving computer.

For example, an "applet" is a program which is able to be transmitted using a network of computers and executed at the receiving computer. In the Java programming language environment (and for other applet programming language environments such as ActiveX), each applet includes an editable program and a graphical display image. While it would be advantageous to be able to transmit applets using electronic mail, it is often not desirable to transmit the editable program portion of the applet.

An aspect of this problem is that there are many operations in which applets might be useful in electronic mail, such as providing dynamically updated information, providing templates for creating replies, transmitting to mailing lists, and the like. However, in many cases the power of providing these operations using applets is itself a strong reason not to provide the applet code to the electronic mail recipient.

Accordingly, it would be desirable to provide a method and system for transmitting electronic mail which includes the operational results of one or more applets. This advantage is achieved in an embodiment of the invention in which links between applets and links within a applet, which are unnecessary to display of the information desired by the sender to be presented with the electronic mail, are broken at or near a time when the electronic mail is formatted for transmission.

SUMMARY OF INVENTION

The invention provides a method and system for formatting electronic mail for transmission, in which electronic mail messages include the operational results of one or more applets. An electronic mail client creates an electronic mail message using one or more applets, each of which may operate to actively receive, transform, and display information to be presented with the electronic mail message. At or near a time when the electronic mail message is formatted for transmission, editable program code for the applets is removed, and any dynamic links between the applets are broken. The electronic mail message made available to the receiver can thus include active elements, but any applets which are received are not editable by the receiver.

DETAILED DESCRIPTION OF THE PREFERRED EMBODIMENT

Figure 1:
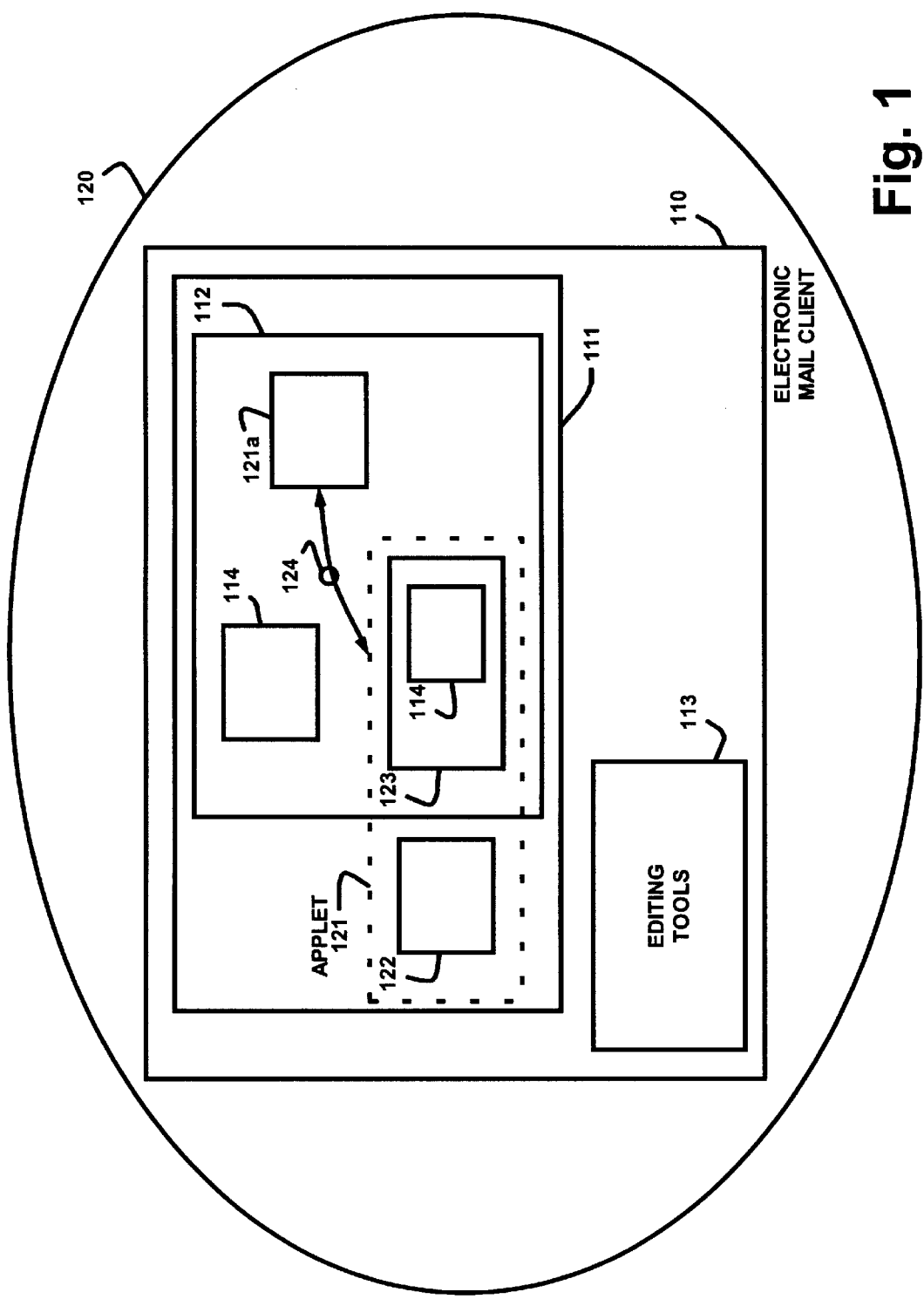
FIG. 1 shows a block diagram of a system including an electronic mail client with an electronic mail message including applets.

In the following description, a preferred embodiment of the invention is described with regard to preferred process steps and data structures. Those skilled in the art would recognize after perusal of this application that embodiments of the invention can be implemented using general purpose processors or special purpose processors adapted to particular process steps and data structures described herein, and that implementation of the process steps and data structures described herein would not require undue experimentation or further invention.

Inventions described herein can be used in conjunction with inventions described in the following applications:

application Ser. No. 08/918,096, filed Aug. 21, 1997, in the name of the same inventor, titled "Micro-Client For Internet Appliance", pending; and application Ser. No. 08/918,094, filed , Aug. 21, 1997, in the name of the same inventor, titled "Secure Graphical Objects in Web Documents", now U.S. Pat. No. 6,032,150, issued Feb. 29, 2000.

Each of these applications is hereby incorporated by reference as if fully set forth herein.

Electronic Mail Client and Messages

FIG. 1 shows a block diagram of a system including an electronic mail client with an electronic mail message including applets.

In a system 100 including an electronic mail client 110 and an applet programming environment 120, the electronic mail client 110 includes a buffer 111 for creating an electronic mail message 112, and a set of editing tools 113 for editing the electronic mail message 112.

As used herein, the term "electronic mail" as used in the phrases "electronic mail client", "electronic mail message", and the like, refers to information transfer using one of several electronic mail protocols, and ententions and variants thereof. These electronic mail protocols include, for example, the POP3 and SMTP electronic mail protocols.

The reader is cautioned that electronic mail protocols are rapidly evolving, with many new protocols, many variants and many extentions, modifications, and variants thereof, both official and unofficial. Some of these extensions, modifications, and variants include those which have security features, those which are particular to certain languages or character sets, those which are particular to certain display features, and so on. Not all electronic mail clients or servers are compatible with all extensions, modifications, and variants of all electronic mail protocols, and it is expected both that further electronic mail protocols, as well as extensions, modifications, and variants of electronic mail protocols will continue to develop, and that this lack of industry-wide compatibility will continue for the near future.

Those skilled in the art would be aware, after perusing this application, that the invention is applicable to all such extensions, modifications, and variants of electronic mail protocol, without undue experimentation or further invention, and that the scope and spirit of the invention is broad enough to encompass all such applications.

The electronic mail message 112 includes a set of information elements 114, such as text elements or graphical elements. The information elements 114 can communicate information to a recipient of the electronic mail message 112.

The electronic mail message 112 can also include an applet 121, which includes an editable portion 122 and a presentation portion 123. The editable portion 122 includes program code and data structures for the applet 121, such as in the Java programming environment or another means for applet program specification such as the ActiveX programming environment. The presentation portion 123 includes further information elements 114, such as text elements or graphical elements, which are produced by the applet 121 for ultimate presentation to the recipient of the electronic mail message 112.

When the electronic mail message 112 is formatted for transmission, the electronic mail client 110 breaks the link between the editable portion 122 of the applet 121 and the presentation portion 123 of the applet 121. Only the presentation portion 123 of the applet 121 is included in the electronic mail message 112 when transmitted.

The electronic mail message 112 before formatting for transmission can include multiple applets, such as applets 121 and 121a shown in FIG. 1. For example, the electronic mail message can be generated based on a formatting template for the electronic mail message 112. In other words, the electronic mail message 112 itself (before formatting for transmission) can include not only text, but also applets from the formatting template. In this arrangement, individual fields of the electronic mail message 112 each can be implemented or generated by an applet 121 which receives, transforms, and formats information for inclusion in the electronic mail message 112.

For example, a "reply" formatting template can include an applet 121 which is included in the electronic mail message itself. This "reply" template can receive header information from the electronic mail message being replied to and transform that header information into header information for the reply.

When the electronic mail message 112 is formatted for transmission, the electronic mail client 110 sends only the presentation portions of any included applets. These presentation portions include the transformed information generated by the applets. Thus, only the information for each field after it has been transformed by the applets is sent, rather than the entire applets.

For a first example, a signature applet in the electronic mail message can receive a signature from the user of the electronic mail client 110, and in response generate a graphical element (such as in a GIF format, JPEG format, or animation format) for inclusion in the electronic mail message 112. The transmitted electronic mail message 112 would include only the generated graphical element that forms the presentation portion of the applet, not the entire signature applet.

For a second example, a graphical editing applet in the electronic mail message can receive a graphical element (such as in the GIF format, JPEG format, or animation format) and apply editing tools to that graphical element to transform it for inclusion in the electronic mail message 112.

The electronic mail message 112 can also include multiple applets with one or more communication links between various ones of the applets. For example, the electronic mail message 121 could include multiple applets 121 and 121a connected by communication link 124. A first applet 121 could receive text information and a second applet 121 a could transform that text into a graphical element (or retrieves information from a database or file system) for inclusion in the electronic mail message 112. For example, the "reply" formatting template can include an addressing applet which retrieves an address for the recipient, and can include a mailing list applet which retrieves a set of addresses for a mailing list of recipients.

When the electronic mail message 112 is formatted for transmission, the electronic mail client 110 breaks the communication links 124 between pairs of the applets 121. Again, only the presentation portions of each of the applets are included in the electronic mail message 112.

When the electronic mail message 112 is formatted for transmission, the electronic mail client 110 breaks the link between the editable portion 122 of the applet 121 and the presentation portion 123 of the applet 121. Only the presentation portion 123 of the applet 121 is included in the electronic mail message 112.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A method, including the steps of:

constructing an electronic mail message including an applet, said applet including an editable portion and a presentation portion, said presentation portion generated at least in part by said applet; and formatting said electronic mail message for transmission, wherein said step of formatting includes excluding said editable portion while including at least part of the presentation portion;

wherein said electronic mail message includes a plurality of applets, said plurality of applets including at least one dynamic link between a pair of said applets, and said step of formatting includes excluding said dynamic link while including at least one of said pair of applets.

2. A method as in claim 1, wherein said electronic mail message includes an information element.

3. A method as in claim 1, wherein said applet includes means for receiving, transforming, and displaying information in association with said electronic mail message.

4. A method as in claim 3, wherein said step of formatting includes excluding said means for receiving and said means for transforming and including a result of said means for transforming.

5. A method as in claim 3, wherein said applet includes means for receiving a handwritten signature and for displaying said handwritten signature to a recipient of said electronic mail message.

6. A method, including the steps of:

constructing an electronic mail message including a plurality of applets, said applets including at least a dynamic link between a pair of said applets; and formatting said electronic mail message for transmission, wherein said step of formatting includes excluding said dynamic link while including at least one of said pair of applets.

7. A method as in claim 6, wherein said electronic mail message includes an information element.

8. A method as in claim 6, wherein each of said applets includes means for receiving, transforming, and displaying information in association with said electronic mail message.

9. A method as in claim 8, wherein said step of formatting includes excluding said means for receiving and said means for transforming and including a result of said means for transforming.

10. A method as in claim 8, wherein each of said applets includes means for receiving a handwritten signature and for displaying said handwritten signature to a recipient of said electronic mail message.

11. A method, including the steps of:

constructing an electronic mail message including a plurality of ActiveX applets, said applets including at least a dynamic link between a pair of said applets; and formatting said electronic mail message for transmission, wherein said step of formatting includes excluding said dynamic link while including at least one of said pair of applets.

12. An apparatus capable of sending electronic mail messages, comprising:

an interface through which said electronic mail messages can be sent;

a memory that stores information including instructions; and a processor that executes the instructions to control sending the electronic mail messages, said instructions comprising the steps of: (a) constructing an electronic mail message including an applet, said applet including an editable portion and a presentation portion, said presentation portion generated at least in part by said applet, and (b) formatting said electronic mail message for transmission, wherein said step of formatting includes excluding said editable portion while including at least part of the presentation portion, wherein said electronic mail message includes a plurality of applets, said plurality of applets including at least one dynamic link between a pair of said applets, and said step of formatting includes excluding said dynamic link while including at least one of said pair of applets.

13. An apparatus as in claim 12, wherein said electronic mail message includes an information element.

14. An apparatus as in claim 12, wherein said applet includes means for receiving, transforming, and displaying information in association with said electronic mail message.

15. An apparatus as in claim 14, wherein said step of formatting includes excluding said means for receiving and said means for transforming and including a result of said means for transforming.

16. An apparatus as in claim 14, wherein said applet includes means for receiving a handwritten signature and for displaying said handwritten signature to a recipient of said electronic mail message.

17. An apparatus capable of sending electronic mail messages, comprising:
    an interface through which said electronic mail messages can be sent;
    a memory that stores information including instructions; and
    a processor that executes the instructions to control sending the electronic mail messages, said instructions comprising the steps of: (a) constructing an electronic mail message including a plurality of applets, said applets including at least a dynamic link between a pair of said applets, and (b) formatting said electronic mail message for transmission, wherein said step of formatting includes excluding said dynamic link while including at least one of said pair of applets.

18. An apparatus as in claim 17, wherein said electronic mail message includes an information element.

19. An apparatus as in claim 17, wherein each of said applets includes means for receiving, transforming, and displaying information in association with said electronic mail message.

20. An apparatus as in claim 19, wherein said step of formatting includes excluding said means for receiving and said means for transforming and including a result of said means for transforming.

21. An apparatus as in claim 19, wherein each of said applets includes means for receiving a handwritten signature and for displaying said handwritten signature to a recipient of said electronic mail message.

22. An apparatus capable of sending electronic mail messages, comprising:
    an interface through which said electronic mail messages can be sent;
    a memory that stores information including instructions; and
    a processor that executes the instructions to control sending the electronic mail messages, said instructions comprising the steps of: (a) constructing an electronic mail message including a plurality of ActiveX applets, said applets including at least a dynamic link between a pair of said applets, and (b) formatting said electronic mail message for transmission, wherein said step of formatting includes excluding said dynamic link while including at least one of said pair of applets.

23. A memory storing information including instructions, the instructions executable by a processor to send electronic mail messages, the instructions comprising:
    constructing an electronic mail message including an applet, said applet including an editable portion and a presentation portion, said presentation portion generated at least in part by said applet;
    formatting said electronic mail message for transmission, wherein said step of formatting includes excluding said editable portion while including at least part of the presentation portion;
    wherein said electronic mail message includes a plurality of applets, said plurality of applets including at least one dynamic link between a pair of said applets, and said step of formatting includes excluding said dynamic link while including at least one of said pair of applets.

24. A memory as in claim 23, wherein said electronic mail message includes an information element.

25. A memory as in claim 23, wherein said applet includes means for receiving, transforming, and displaying information in association with said electronic mail message.

26. A memory as in claim 25, wherein said step of formatting includes excluding said means for receiving and said means for transforming and including a result of said means for transforming.

27. A memory as in claim 25, wherein said applet includes means for receiving a handwritten signature and for displaying said handwritten signature to a recipient of said electronic mail message.

28. A memory storing information including instructions, the instructions executable by a processor to send electronic mail messages, the instructions comprising:
    constructing an electronic mail message including a plurality of applets, said applets including at least a dynamic link between a pair of said applets; and
    formatting said electronic mail message for transmission, wherein said step of formatting includes excluding said dynamic link while including at least one of said pair of applets.

29. A memory as in claim 28, wherein said electronic mail message includes an information element.

30. A memory as in claim 28, wherein each of said applets includes means for receiving, transforming, and displaying information in association with said electronic mail message.

31. A memory as in claim 30, wherein said step of formatting includes excluding said means for receiving and said means for transforming and including a result of said means for transforming.

32. A memory as in claim 30, wherein each of said applets includes means for receiving a handwritten signature and for displaying said handwritten signature to a recipient of said electronic mail message.

33. A memory storing information including instructions, the instructions executable by a processor to send electronic mail messages, the instructions comprising:
    constructing an electronic mail message including a plurality of ActiveX applets, said applets including at least a dynamic link between a pair of said applets; and
    formatting said electronic mail message for transmission, wherein said step of formatting includes excluding said dynamic link while including at least one of said pair of applets.

* * * * *